(12) United States Patent
Araki

(10) Patent No.: US 12,024,282 B2
(45) Date of Patent: Jul. 2, 2024

(54) GUIDANCE DEVICE, FLYING OBJECT, AIR DEFENSE SYSTEM AND GUIDANCE PROGRAM

(71) Applicant: MITSUBISHI HEAVY INDUSTRIES, LTD., Tokyo (JP)

(72) Inventor: Shunsuke Araki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 399 days.

(21) Appl. No.: 17/087,955

(22) Filed: Nov. 3, 2020

(65) Prior Publication Data
US 2021/0188431 A1 Jun. 24, 2021

(30) Foreign Application Priority Data

Dec. 20, 2019 (JP) ................................. 2019-230926

(51) Int. Cl.
*B64C 39/02* (2023.01)
*F41H 11/02* (2006.01)
*G05D 1/00* (2006.01)
*B64U 101/00* (2023.01)

(52) U.S. Cl.
CPC ............ *B64C 39/024* (2013.01); *F41H 11/02* (2013.01); *G05D 1/12* (2013.01); *B64U 2101/00* (2023.01); *B64U 2201/10* (2023.01)

(58) Field of Classification Search
CPC ......... B64C 39/024; F41H 11/02; G05D 1/12; B64U 2101/00; B64U 2201/10
See application file for complete search history.

(56) References Cited

U.S. PATENT DOCUMENTS

| 2018/0251218 A1 | 9/2018 | Wilkinson |
| 2018/0341262 A1* | 11/2018 | Yeshurun ................. G01S 7/38 |
| 2019/0019051 A1 | 1/2019 | Saito et al. |

(Continued)

FOREIGN PATENT DOCUMENTS

| JP | 2017-174110 A | 9/2017 |
| JP | 2019-023553 A | 2/2019 |

(Continued)

OTHER PUBLICATIONS

Office Action issued Aug. 1, 2023 in Japanese Patent Application No. 2019-230926, with English translation, 11 pages.

*Primary Examiner* — Jelani A Smith
*Assistant Examiner* — Davin Seol
(74) *Attorney, Agent, or Firm* — Wenderoth, Lind & Ponack, L.L.P.

(57) ABSTRACT

A guidance device 120 is provided with a processing device 124 that generates a control signal to control a propulsion device 110 of a flying object 100 and a communication device 121 that transmits the control signal to the propulsion device 110. The processing device 124 generates a patrol control signal to control the propulsion device 110 so that the flying object 100 flies along a first patrol path and generates, based on information of a moving object that the flying object 100 is to intercept, an interception control signal to control the propulsion device 110 so that the flying object 100 flies toward the moving object. In addition, the processing device 124 generates, when generating the interception control signal, a notification signal to notify that the flying object 100 flies toward the moving object.

8 Claims, 17 Drawing Sheets

(56) References Cited

U.S. PATENT DOCUMENTS

| | | | |
|---|---|---|---|
| 2019/0025858 A1* | 1/2019 | Bar-Nahum | G06V 20/13 |
| 2019/0063881 A1 | 2/2019 | Abramov et al. | |
| 2019/0114929 A1 | 4/2019 | Sasaki | |
| 2019/0285388 A1* | 9/2019 | Klar | F41H 13/0006 |
| 2020/0041234 A1 | 2/2020 | Abramov | F41H 11/02 |
| 2020/0064443 A1* | 2/2020 | Yoon | H04K 3/825 |
| 2020/0108924 A1* | 4/2020 | Smith | F41H 13/0043 |
| 2020/0108926 A1* | 4/2020 | Smith | G05D 1/12 |
| 2020/0269978 A1* | 8/2020 | Wang | B64C 27/20 |
| 2021/0309364 A1* | 10/2021 | Lei | B60L 58/13 |

FOREIGN PATENT DOCUMENTS

| | | | |
|---|---|---|---|
| JP | 2019-060589 A | 4/2019 | |
| JP | 2019-073056 A | 5/2019 | |

\* cited by examiner

FIG. 8

| Flying Object | Initial Patrol Path | Change of Patrol Path | | | |
|---|---|---|---|---|---|
| | | Flying Object to be out from Patrol Path | | | |
| | | First Flying Object | Second Flying Object | Third Flying Object | Fourth Flying Object |
| First Flying Object | First Patrol Path | — | No Change | Fourth Patrol Path | Fourth Patrol Path |
| Second Flying Object | Second Patrol Path | First Patrol Path | — | No Change | First Patrol Path |
| Third Flying Object | Third Patrol Path | Second Patrol Path | Second Patrol Path | — | No Change |
| Fourth Flying Object | Fourth Patrol Path | No Change | Third Patrol Path | Third Patrol Path | — |

231

GUIDANCE DEVICE, FLYING OBJECT, AIR DEFENSE SYSTEM AND GUIDANCE PROGRAM

TECHNICAL FIELD

The present invention relates to a guidance device, a flying object, an air defense system and a guidance program.

BACKGROUND ART

An air defense system includes a system that uses a vehicles equipped with a missile. When using such an air defense system, the vehicle is moved to a desired position in order to launch the missile. Therefore, time is needed to deploy the vehicle.

SUMMARY OF INVENTION

Problem to be Solved by the Invention

In view of the above situation, one of objectives is to provide an efficiently deployable air defense system. Other objectives can be understood by disclosures and description of embodiments as follows.

Means for Solving the Problem

Means for solving the problem will be described in the following by use of numbers and symbols used in the description of embodiments. Those numbers and symbols are added in parentheses as reference, in order to show an example of correspondence relationship between description in claims and description of embodiments. Therefore, claims are not to be limitedly construed by description in parentheses.

A guidance device (120) according to an embodiment to achieve the above-mentioned objective is provided with a processing device (124) that generates a control signal to control a propulsion device (110) of a flying object (100) and a communication device (121) that transmits the control signal to the propulsion device (110). The processing device (124) generates a patrol control signal to control the propulsion device so that the flying object including the processing device (124) flies along a first patrol path and generates, based on information of a moving object (20) the flying object including the processing device (124) is to intercept, an interception control signal to control the propulsion device so that the flying object including the processing device (124) flies toward the moving object. In addition, the processing device (124) generates, when generating the interception control signal, a notification signal to notify other flying objects (100) that the flying object flies toward the moving object. The processing device (124) of one of other flying objects (100) generates, based on the notification signal, a deployment control signal to control the propulsion device (110) of the one of other flying objects (100) so that the one of other flying objects (100) flies toward the first patrol path from a second patrol path.

A flying object (100) according to an embodiment to achieve the above-mentioned objective is provided with the above described guidance device (120), a propulsion device (110) and a detection device (130). The detection device (130) detects a moving object (20) to intercept. The processing device (124) of the guidance device (120) determines, based on information of the moving object (20) detected by the detection device (130), whether to intercept the moving object (20).

An air defense system (1000) according to an embodiment to achieve the above-mentioned objective is provided with the above described flying object (100), a storage device (300) that stores a plurality of the flying objects (100) and a central control device (330). The central control device (330) assigns the first patrol path to the flying object and transmits an assignment signal including information indicating the first patrol path to the flying object. The processing device (124) of the flying object (100) generates, based on the assignment signal, a deployment control signal to control the propulsion device so that the flying object flies toward the first patrol path.

A guidance program (200) according to an embodiment to achieve the above-mentioned objective makes a processor execute a patrol module (210) and an interception module (220). The patrol module (210) generates a patrol control signal to control a propulsion device (110) of a flying object so that the flying object (100) flies along a first patrol path. The interception module (220) generates, based on information of a moving object (20) that the flying object is to intercept, an interception control signal to control the propulsion device so that the flying object flies toward the moving object. In addition, the patrol module (210) generates, when generating the interception control signal, a notification signal to notify that the flying object flies toward the moving object.

Effects of the Invention

According to the above-mentioned embodiments, an air defense system can be efficiently deployed.

BRIEF DESCRIPTION OF DRAWINGS

FIG. 8 It is a configuration diagram of a path change table according an embodiment.

DESCRIPTION OF EMBODIMENTS

First Embodiment

Figure 1:
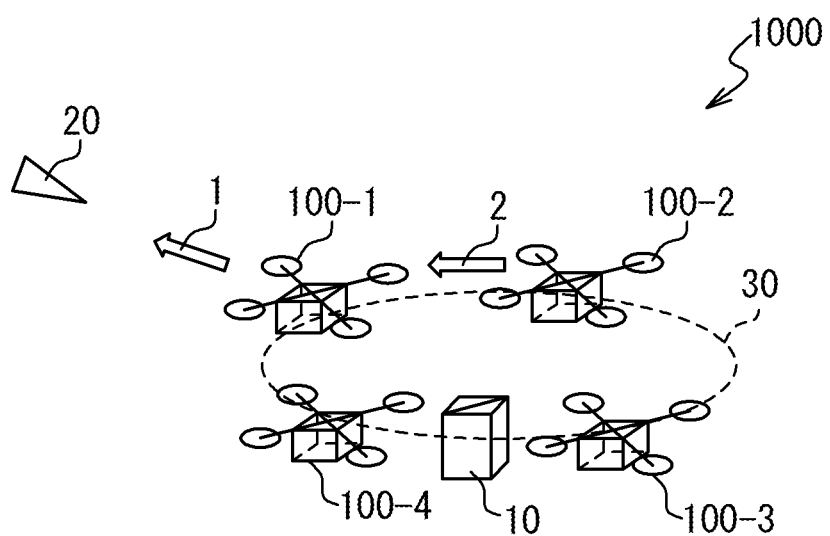
FIG. 1 It is a schematic diagram of an air defense system according to an embodiment.

As shown in FIG. 1, an air defense system 1000 according to an embodiment is provided with a plurality of flying objects 100 (for example, a first flying object 100-1, a second flying object 100-2, a third flying object 100-3 and a fourth flying object 100-4). The flying objects 100 protect a protection target 10 from a target 20 such as a moving object. For example, the flying objects 100 are deployed along a preset defense line 30. The first flying object 100-1 flies, when detecting the target 20, toward the target 20, as shown by an arrow 1. The first flying object 100-1 transmits, when flying toward the target 20, a notification signal to other flying objects 100. The second flying object 100-2 flies, when receiving the notification signal, so as to occupy a space where the first flying object 100-1 was deployed, as shown by an arrow 2. Furthermore, the first flying object 100-1 transmits, when it cannot destroy the target 20, an interception fail signal to the other flying objects 100. The second flying objects 100-2 flies, when receiving the interception fail signal, toward the target 20.

Figure 2:
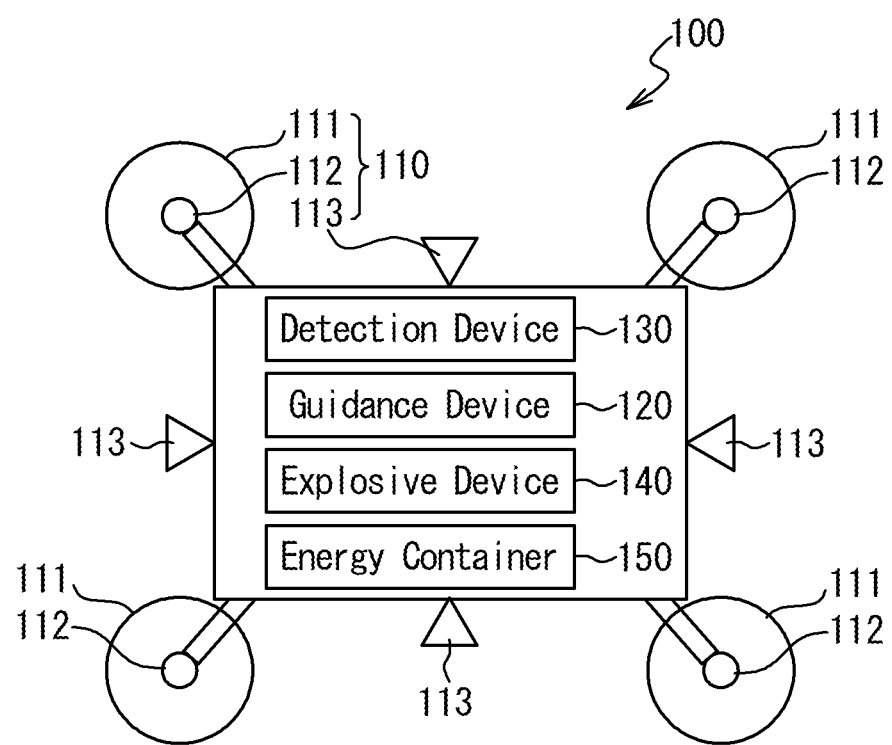
FIG. 2 It is a configuration diagram of a flying object according to an embodiment.

A flying object 100 may be provided with propulsion devices 110, a guidance device 120, a detection device 130, an explosive device 140 and an energy container 150, as shown in FIG. 2. The guidance device 120 controls the propulsion devices 110 and makes the flying object 100 fly to a desired position. When the detection device 130 detects a target 20, the guidance device 120 controls the propulsion devices 110 so that the flying object 100 flies toward the target 20. When the flying object 100 reaches a vicinity of the target 20, the guidance device 120 detonates the explosive device 140. The guidance device 120 may control the propulsion devices 110 so that the flying object 100 collides with the target 20. The flying object 100 includes for example an unmanned aerial vehicle, a fixed-wing aircraft, a rotary-wing aircraft, a multicopter (such as a multicopter having three or more rotary wings 111), a drone, or the like.

A propulsion device 110 is provided with a rotary wing 111, a motor 112 and a rocket engine 113. The motor 112 rotates the rotary wing 111 to make the flying object 100 fly. The rocket engine 113 injects a propellant such as compressed air to give thrust to the flying object 100. The rocket engine 113 is used when flying toward the target at high speed, when rapidly changing a direction of travel, or the like. A plurality of rocket engines 113 are provided so as to be able to inject the propellant in four directions: front, rear, left and right, for example. By selectively start rocket engines 113, the flying object 100 can fly toward the target 20. A plurality of rocket engines 113 may be provided so as to be able to inject the propellant in up-and-down directions.

The propulsion devices 110 are not limited to the above as long as they can give thrust to the flying object 100 and control the direction of travel. For example, the propulsion device 110 may be provided with a jet engine.

The detection device 130 detects the target and transmits information of the detected target 20 to the guidance device 120. The information of the target 20 may include a distance and a direction to the target 20, an altitude, a shape and a velocity of the target 20, and the like. The detection device 130 may include a radar, an optical camera (for example, a visible light camera, an infrared camera), or the like.

The explosive device 140 includes gunpowder or the like and detonates under a control of the guidance device 120. The explosive device 140 destroys, by detonating, objects around the flying object 100 such as the target 20.

The energy container 150 supplies energy to the propulsion device 110. The energy container 150 stores electric power to rotate motor 112 and fuel of rocket engine 113. The energy container 150 may measure an energy storage quantity of the electric power and the fuel that are stored. The energy container 150 includes a fuel tank, a battery, or the like.

Figure 3:
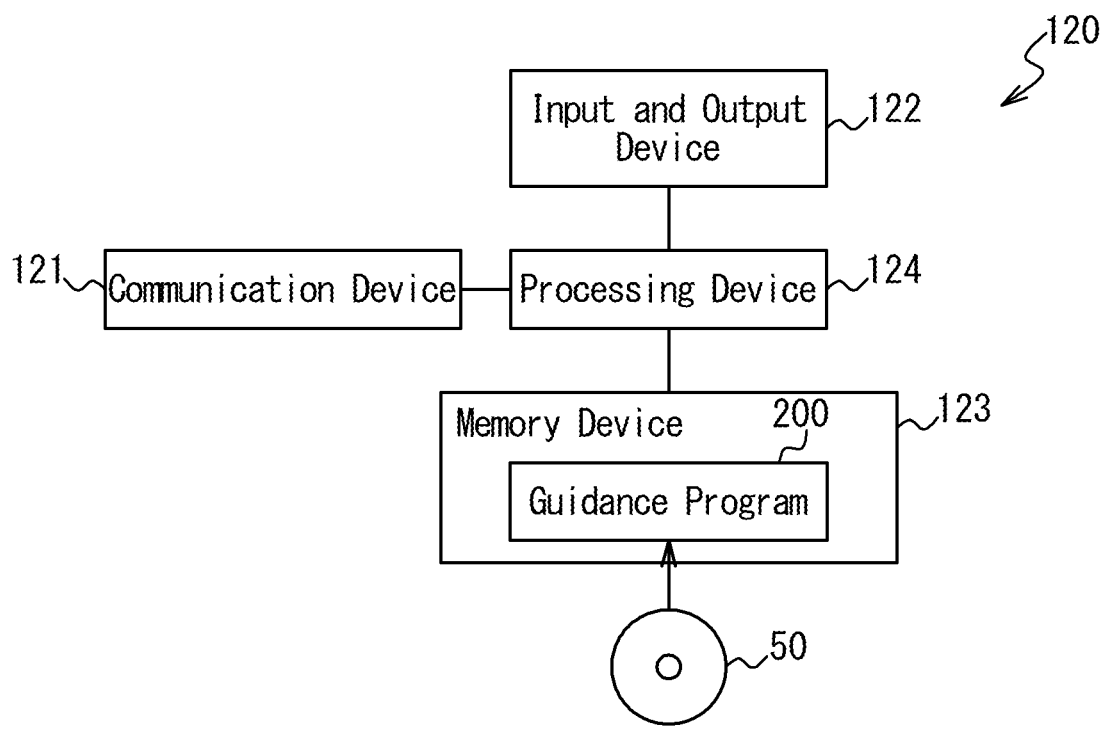
FIG. 3 It is a configuration diagram of a guidance device according to an embodiment.

The guidance device 120 controls the propulsion device 110, the detection device 130 and the explosive device 140. The guidance device 120 may be, as shown in FIG. 3, provided with a communication device 121, an input and output device 122, a memory device 123 and a processing device 124.

The communication device 121 is electrically connected to the propulsion device 110, the detection device 130, the explosive device 140 and the energy container 150 and perform communication with respective devices by wire or wirelessly. The communication device 121 performs communication with external devices such as other flying objects 100. The communication device 121 transfers data received from respective devices to the processing device 124.

In addition, the communication device 121 transfers signals generated by the processing device 124 to respective devices. The communication device 121 includes various interfaces such as Network Interface Card (NIC) and Universal Serial Bus (USB).

The input and output device 122 receives information for the processing device 124 to execute processes. In addition, the input and output device 122 outputs a result of processes executed by the processing device 124. The input and output device 122 includes a variety of input devices and output devices, and includes for example a keyboard, a mouse, a microphone, a display, a speaker, a touch panel, or the like. The input and output device 122 may be removed when no information is inputted.

The memory device 123 stores various data for guiding the flying objects 100, such as a guidance program 200. The memory device 123 is used as a non-transitory tangible storage medium that stores the guidance program 200. The guidance program 200 may be provided as a computer program product stored in a recording medium 50 readable by a computer or may be provided as a computer program product downloadable from a server.

The processing device 124 performs various data processes for guiding the flying objects 100. The processing device 124 reads from the memory device 123 and executes the guidance program 200 to generate control signals for controlling respective devices. For example, the processing device 124 includes a Central Processing Unit (CPU) and the like.

Figure 4:
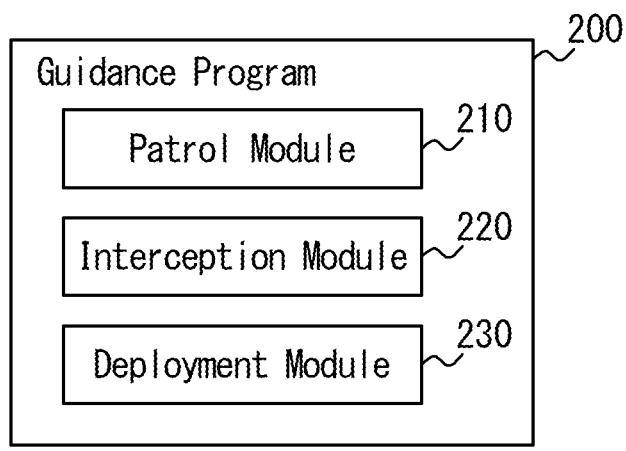
FIG. 4 It is a configuration diagram of a guidance program according to an embodiment.

As shown in FIG. 4, the guidance program 200 executed by the processing device 124 is provided with a patrol module 210, an interception module 220 and a deployment module 230. In accordance with the patrol module 210, the processing devices 124 (for example, the processing device 124 of the flying object 100-1) generates a patrol control signal to control the propulsion device 110 (for example, the propulsion device 110 of the flying object 100-1) so as to fly along a patrol path set on the defense line 30. For example, when the patrol path indicates a desired position on the defense line 30, the processing device 124 (for example, the processing device 124 of the flying object 100-1) controls the propulsion device 110 (for example, the propulsion device 110 of the flying object 100-1) so that the flying object 100 (for example, the flying object 100-1) performs a hovering at the position indicated by the patrol path.

In accordance with the interception module 220, the processing device 124 (for example, the processing device 124 of the flying object 100-1) generates an interception control signal to control the propulsion device 110 (for example, the propulsion device 110 of the flying object 100-1) so that the flying object 100 (for example, the flying object 100-1) flies toward the target 20. In addition, the processing device 124 (for example, the processing device 124 of the flying object 100-1) may, when the flying object 100 (for example, the flying object 100-1) reaches a vicinity of the target 20, detonate the explosive device 140. For example, the processing device 124 (for example, the processing device 124 of the flying object 100-1) uses a thrust generated by the rotary wing 111 to make the flying object 100 (for example, the flying object 100-1) fly toward the target 20. In addition, the processing device 124 (for example, the processing device 124 of the flying object 100-1) may use a rocket engine 113 to make the flying object 100 (for example, the flying object 100-1) fly toward the target 20.

In accordance with the deployment module 230, the processing device 124 (for example, the processing device 124 of the flying object 100-2) generates a deployment control signal to control the propulsion device 110 (for example, the propulsion device 110 of the flying object 100-2) so that a flying object 100 (for example, the flying object 100-2) flies toward a space of a flying object 100 (for example, the flying object 100-1) that has flied toward the target 20. For example, the processing device 124 (for example, the processing device 124 of the flying object 100-2) may control the propulsion device 110 (for example, the propulsion device 110 of the flying object 100-2) so as to fly toward a first patrol path where another flying object 100 (for example, the flying object 100-1) was flying. In addition, the processing device 124 (for example, the processing device 124 of the flying object 100-2) may make the flying object 100 (for example, the flying object 100-2) fly toward a predetermined patrol path.

(Operations of Flying Objects)

The flying objects 100 are deployed on the defense line 30 so as to surround the protection target 10. The flying objects 100 fly to deployment positions that are predetermined on the defense line 30. The flying objects 100 may automatically fly to the deployment positions under control of the guidance device 120 or may fly to the deployment positions by remote control.

When the flying objects 100 arrive to the deployment positions, the processing device 124 execute the patrol module 210. The patrol module 210 makes the processing device 124 execute processes shown in FIGS. 5A and 5B.

The processing device 124 determines in step S110 whether information of the target 20 is received. The detection device 130 transmits, when detecting the target 20, information of the target 20 to the processing device 124 via the communication device 121. The processing device 124 executes, when the information of the target 20 is received (step S110: Yes), a process in step S120 in order to determine whether to intercept the target 20. When the information of the target 20 is not received (step S110: No), the processing device 124 executes a process in step S150.

In step S120, the processing device 124 acquires, based on the received information of the target 20, a threat level of the target 20. Herein, the threat level indicates a probability that the target 20 harms the protection target 10. This threat level is determined based on speed, travel direction, model and the like of the target 20. For example, when the target 20 is flying in a direction of approaching to the protection target 10, the threat level is high. When the target 20 flies away from the protection target 10, the threat level is low. In addition, when the speed of the target 20 is high, the threat level may be high. When the target 20 is a missile, the threat level is high. The threat level is calculated by the processing device 124.

In step S130, the processing device 124 determines whether the calculated threat level of the target 20 is equal to or higher than a desired threshold value. When the threat level is equal to or higher than the desired threshold value, the processing device 124 moves to a process in step S140 to intercept the target 20 and executes the interception module 220. The processing device 124 transmits, when executing the interception module 220, a notification signal that indicates a departure from the patrol path to other flying objects 100. When the threat level is less than the desired threshold value, the processing device 124 executes a process in step S150.

In step S150, the processing device 124 determines whether an interception fail signal is received from other flying objects 100. When the interception fail signal is received (step S150: Yes), the processing device 124 executes a process in step S160 to deal with the target 20 that could not be intercepted. When no interception fail signal is received (step S150: No), the processing device 124 executes a process in step S170 shown in FIG. 5B.

Figure 5A:
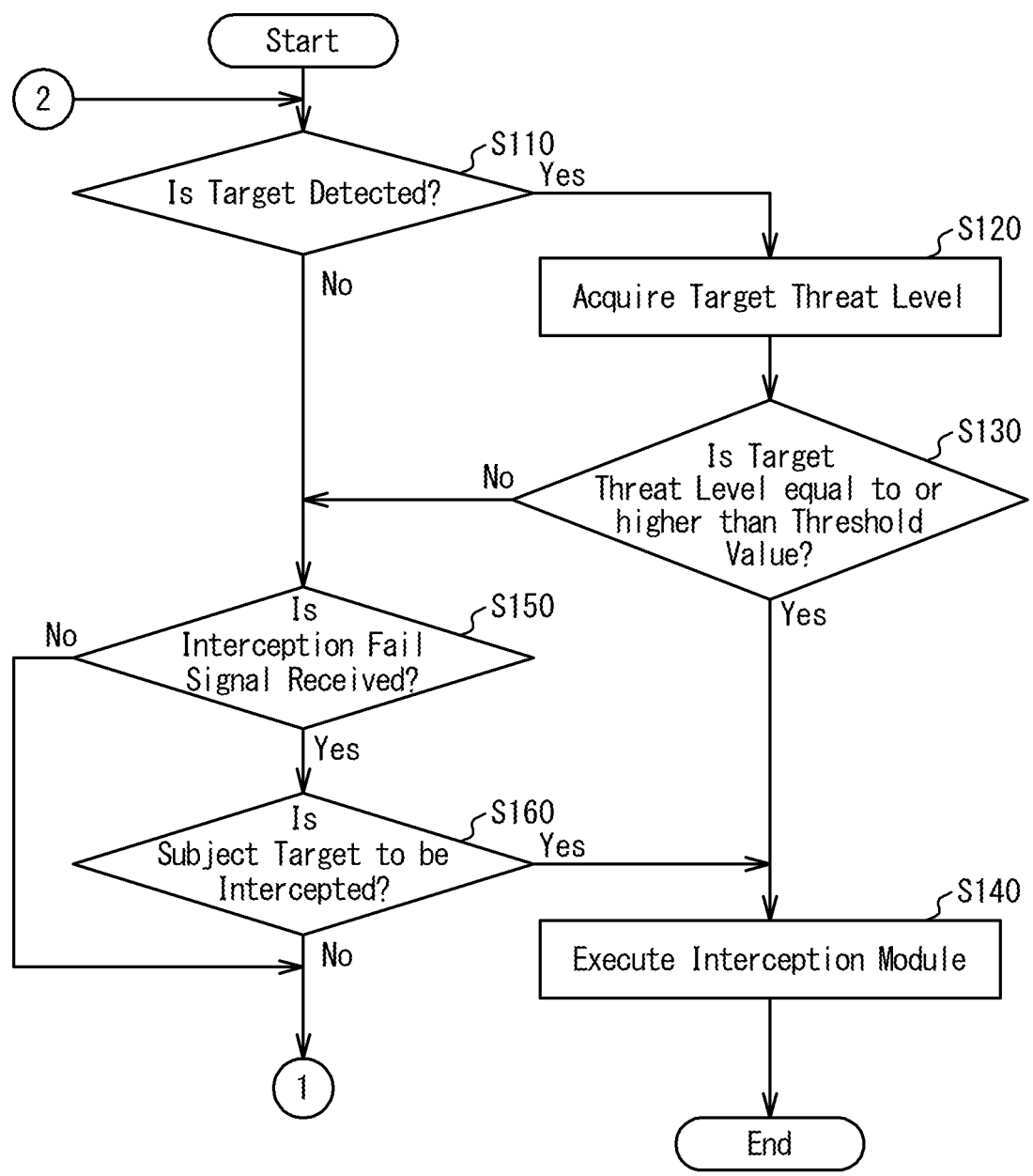
FIG. 5A It is a flowchart that shows processes of a patrol module according to an embodiment.

In step S160 shown in FIG. 5A, the processing device 124 determines whether the own flying object is to intercept the target 20 that could not be intercepted. For example, the processing device 124 calculates, when flying toward the target 20, a predicted intercept point where target 20 is reached. The processing device 124 determines a priority level based on a distance from the own flying object to the predicted intercept point. When the priority level is equal to or higher than a desired threshold value, the processing device 124 determines that the target 20 is to intercept. The processing device 124 moves, when intercepting the target 20 (step S160: Yes), to a process in step S140 to execute the interception module 220. The processing device 124 transmits, when executing the interception module 220, a notification signal that indicates a departure from the patrol path to other flying objects 100. In case of not intercepting the target 20 (step S160: No), the processing device 124 executes a process in step S170 shown in FIG. 5B.

Figure 5B:
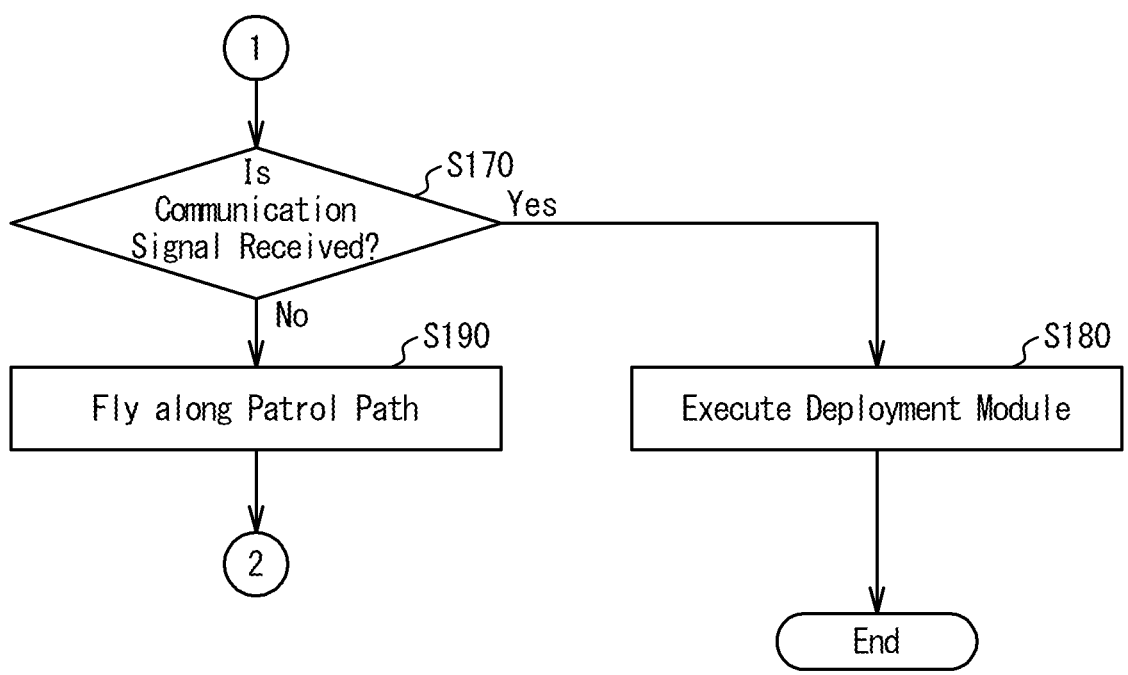
FIG. 5B It is a flowchart that shows processes of a patrol module according to an embodiment.

In step S170 shown in FIG. 5B, the processing device 124 determines whether a notification signal that indicates a departure of other flying objects 100 from the patrol path is received. When the notification signal is received (step S170: Yes), the processing device 124 executes the deployment module 230 in step S180 so that the own flying object flies to occupy a space of the flying object 100 that intercepts. When no notification signal is received (step S170: No), the processing device 124 executes a process in step S190.

In step S190, the processing device 124 makes the own flying object fly along a predetermined patrol path. The processing device 124 returns to the process in step S110 shown in FIG. 5A and repeats the process. The patrol path indicates, for example, performing hovering at a desired position on the defense line 30. In addition, the patrol path may indicates flying around the protection target 10 along the defense line 30.

As described above, the patrol module 210 can make the flying object 100 fly along a desired patrol path. The flying objects 100 can rapidly deal with the target 20 by flying from the defense line 30 to the target 20. In addition, the flying objects 100 can wait for the interception on the target 20 until the target 20 reaches a vicinity of the defense line 30 and the air defense system 1000 can efficiently deal with the target 20. The air defense system 1000 can deal with a plurality of targets 20 since a plurality of flying objects 100 patrol on the defense line 30.

Figure 6A:
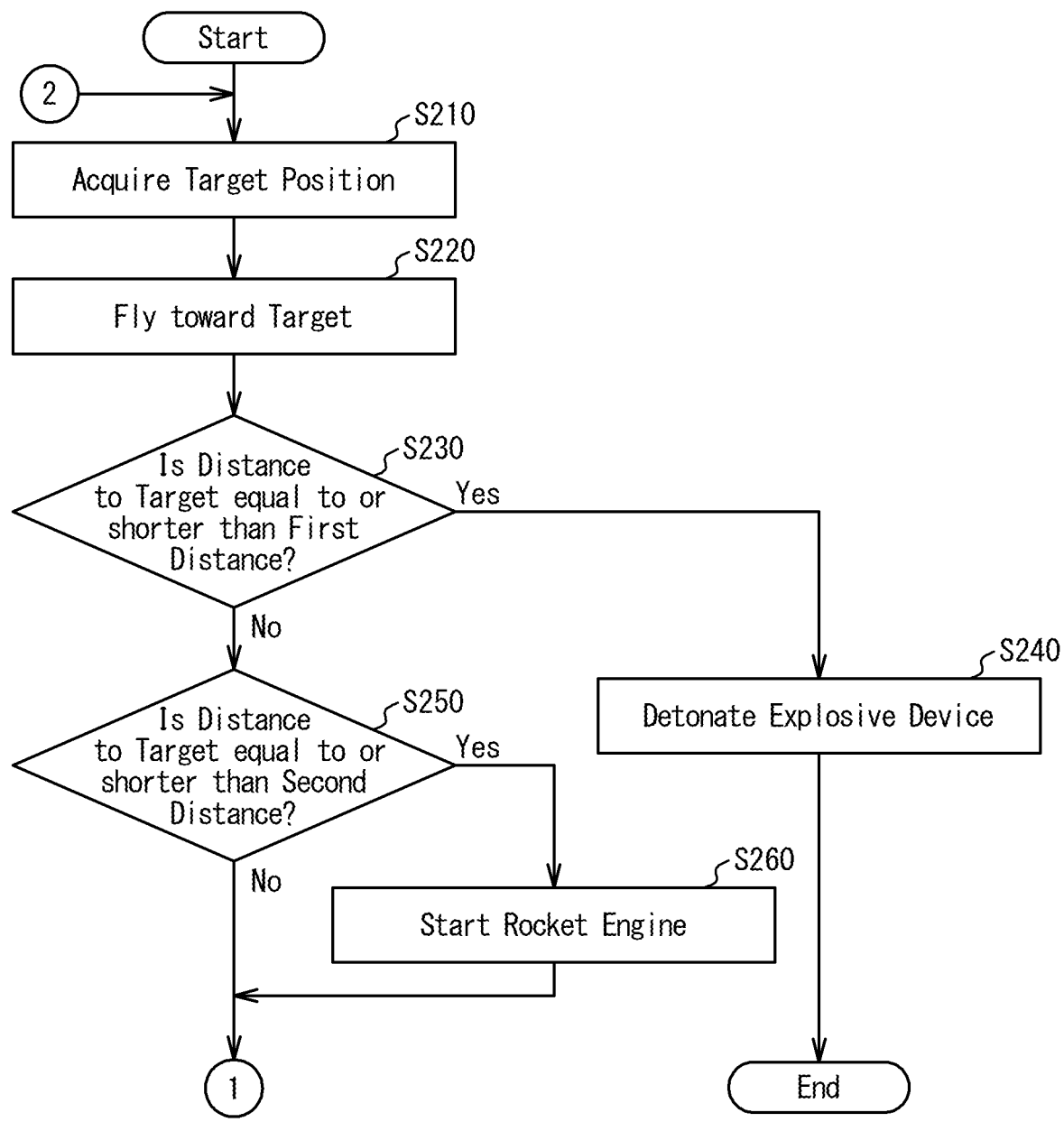
FIG. 6A It is a flowchart that shows processes of an interception module according to an embodiment.
Figure 6B:
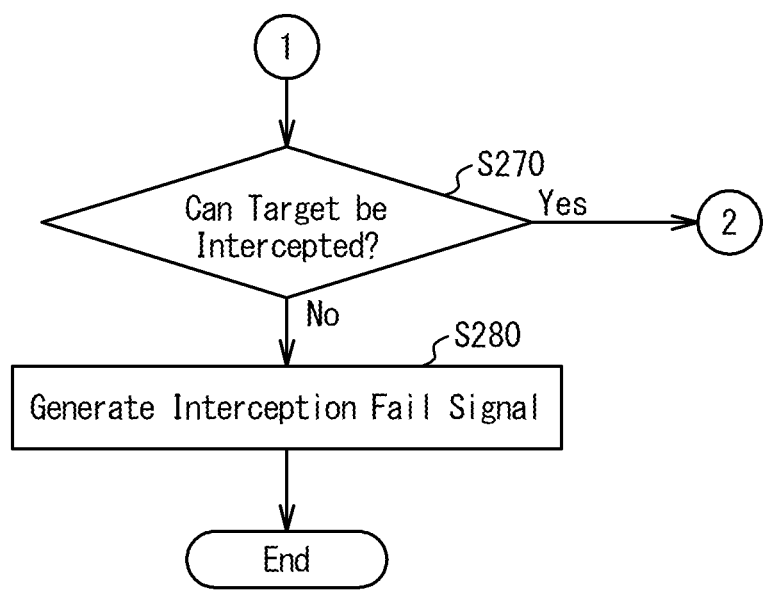
FIG. 6B It is a flowchart that shows processes of an interception module according to an embodiment.

The interception module 220 makes the processing device 124 execute processes shown in FIGS. 6A and 6B. The processing device 124 acquires, in step S210, a position of the target 20. The position of the target 20 is included in the information of the target 20 received from the detection device 130.

In step S220, the processing device 124 makes the own flying object fly toward the target 20. The processing device 124 controls the propulsion device 110 based on the position of the target 20 to make the flying object 100 move to the target 20.

In step S230, the processing device 124 determines whether a distance from the own flying object to the target 20 is equal to or shorter than a first distance. The first distance includes a distance in that the explosive device 140 can destroy surrounding moving objects by exploding. When the distance from the own flying object to the target 20 is equal to or shorter than the first distance (step S230: Yes), the processing device 124 detonates the explosive device 140 in step S240. By detonating the explosive device 140, the target 20 is destroyed. When the distance from the own flying object to the target 20 is longer than the first distance (step S230: No), the processing device 124 executes a process in step S250.

In step S250, the processing device 124 determines whether the distance from the own flying object to the target 20 is equal to or shorter than a second distance. The second distance includes a distance that the rocket engine 113 can fly. When the distance from the own flying object to the target 20 is equal to or shorter than the second distance (step S250: Yes), the processing device 124 executes a process in step S260. When the distance from the own flying object to the target 20 is longer than the second distance (step S250: No), the processing device 124 executes a process in step S270 shown in FIG. 6B.

In step S260 shown in FIG. 6A, the processing device 124 starts the rocket engine 113. By use of the rocket engine 113, the flying object 100 can fly at high speed toward the target 20 and rapidly change the direction of travel.

In step S270 shown in FIG. 6B, the processing device 124 determines whether the own flying object can intercept the target 20. The processing device 124 calculates the intercept point where the target 20 can be reached. Based on the calculated intercept point, the processing device 124 determines whether the own flying object can intercept the target 20. For example, when a distance to the intercept point is shorter than a desired distance, the processing device 124 determines that the own flying object can intercept the target 20. The processing device 124 returns, when determining that the target 20 can be intercepted (step S270: Yes), to step S210 shown in FIG. 6A and repeats the process. The processing device 124 executes, when determining that the target 20 cannot be intercepted (step S270: No), a process in step S280.

The processing device 124 may determine, when the target 20 does not exist in the direction the flying object 100 travels for example, that the flying object 100 cannot intercept the target 20. This is because it indicates that the flying object 100 has passed the target 20. In addition, the processing device 124 may determine, in a case a distance from the own flying object to the target 20 is measured and this distance does not shorten after a flight, that the target 20 cannot be intercepted.

In step S280, the processing device 124 generates an interception fail signal and transmits the generated interception fail signal to other flying objects 100. By doing so, other flying objects 100 can intercept the target 20.

As described above, the interception module 220 can make the flying object 100 fly toward the target 20.

Figure 7:
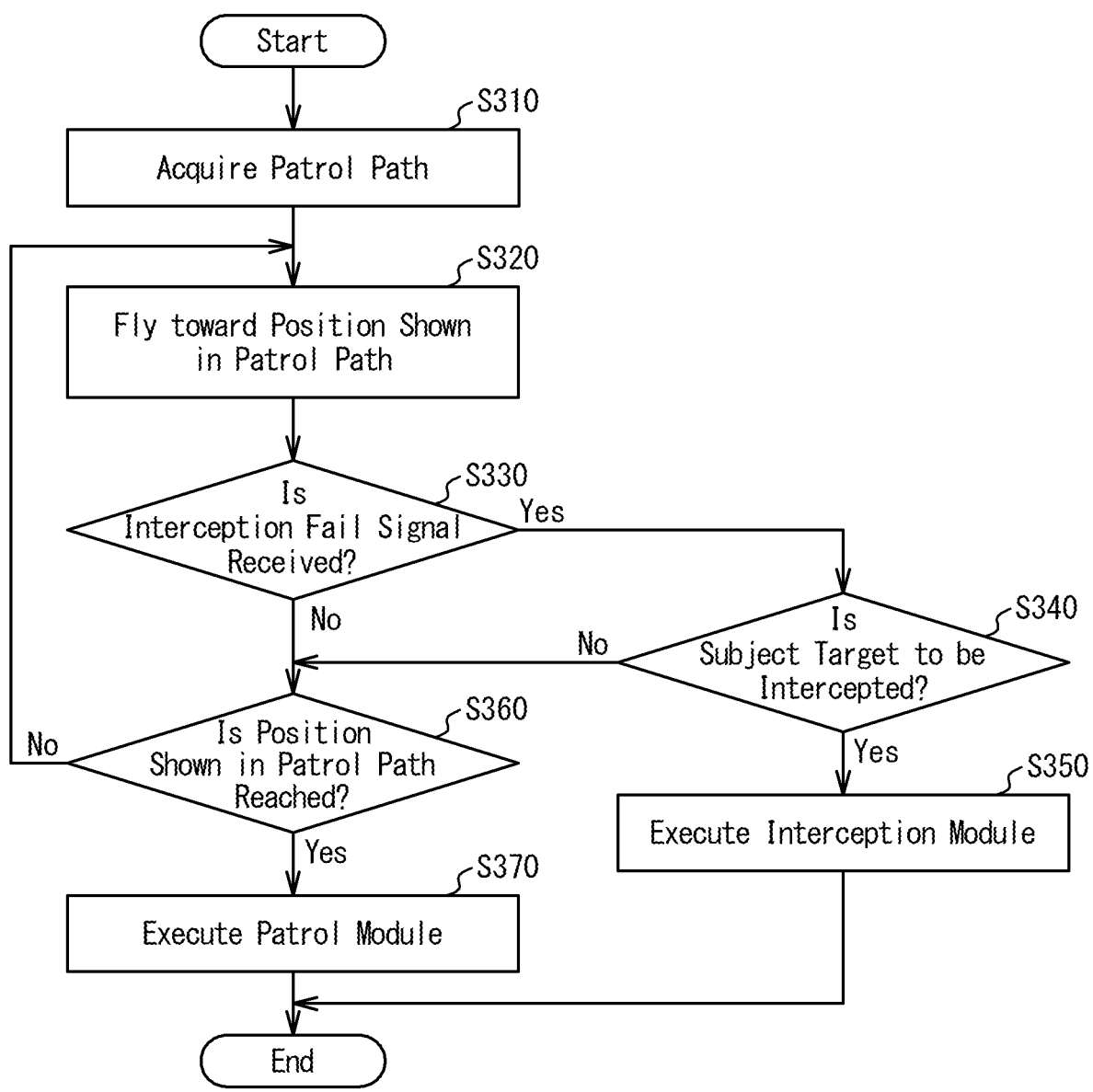
FIG. 7 It is a flowchart that shows processes of a deployment module according to an embodiment.

The deployment module 230 is executed when another flying object 100 flies toward the target in order to change a patrol path of the own flying object. The deployment module 230 makes the processing device 124 execute processes shown in FIG. 7.

In step S310, the processing device 124 acquire a patrol path. For example, the memory device 123 stores a path change table 231 shown in FIG. 8. The path change table 231 indicates patrol paths to be changed in accordance with a flying object 100 that leaves a patrol path. The processing device 124 acquires the patrol paths to be changed.

Figure 9:
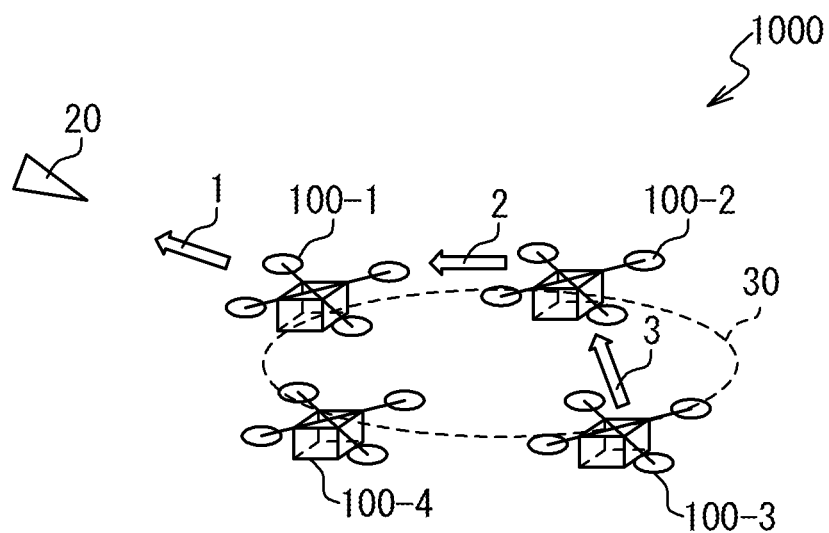
FIG. 9 It is a diagram to describe a change of path of a flying object based on a path change table according to an embodiment.

For example, when the first flying object 100-1 flies toward the target 20, a path of the second flying object 100-2 is changed to a first patrol path and a path of the third flying object 100-3 is changed to a second patrol path. For this reason, as shown in FIG. 9, the first flying object 100-1 flies, as shown by the arrow 1, toward the target 20. The path of the second flying object 100-2 is changed to the first patrol path where the first flying object 100-1 was flying. For this reason, the second flying object 100-2 flies, as shown by the arrow 2, toward the first patrol path. Similarly, the third flying object 100-3 flies, as shown by the arrow 3, toward the second patrol path. For this reason, when the first flying object 100-1 leaves the defense line 30, other flying objects 100 fly so as to occupy the space where the first flying object 100-1 was flying.

When another flying object 100 flies toward the target 20, flying objects 100 except the flying object 100 flying toward the target 20 change the patrol path. For example, as shown in the path change table 231 in FIG. 8, when the second flying object 100-2 flies toward the target 20, a path of the third flying object 100-3 is changed to the second patrol path and a path of the fourth flying object 100-4 is changed to the third patrol path. When the third flying object 100-3 flies toward the target 20, a path of the fourth flying object 100-4 is changed to the third patrol path and a path of the first flying object 100-1 is changed to the fourth patrol path.

With reference to FIG. 7 again, in step S320, the processing device 124 flies, when the patrol path is acquired, toward a position indicated by the patrol path. By doing so, the flying object 100 changes the patrol path.

In step S330, the processing device 124 determines whether an interception fail signal is received. When an interception fail signal is received (step S330: Yes), the processing device 124 executes a process in step S340 in order to deal with the target 20 that could not be intercepted. When no interception fail signal is received (step S330: No), the processing device 124 executes a process in step S360.

In step S340, the processing device 124 determines whether the own flying object is to intercept the target 20 that could not be intercepted. For example, the processing device 124 calculates, when flying toward the target 20, a predicted intercept point where the target 20 is reached. The processing device 124 determines a priority level based on a distance from the own flying object to the predicted intercept point. When the priority level is equal to or higher than a desired threshold value, the processing device 124 determines that the target 20 is to intercept. The processing device 124 moves, when intercepting the target 20 (step S340: Yes), to a process in step S350 to execute the interception module 220. In case of not intercepting the target 20 (step S340: No), the processing device 124 executes a process in step S360 shown in FIG. 7.

In step S360, the processing device 124 determines whether the position indicated by the patrol path to change is reached. The processing device 124 compares a position of the own flying object and the position indicated by the patrol path to change. When a distance from the position of the own flying object to the position indicated by the patrol path is shorter than a desired threshold value, the processing device 124 determines that the position indicated by the patrol path is reached. When the flying object 100 reaches the position indicated by the control path (step S360: Yes), the processing device 124 executes in step S370 the patrol module 210. While the flying object 100 does not reach the position indicated by the patrol path (step S360: No), the processing device 124 returns to the process of step S320 and repeats the process.

As described above, the flying objects 100 can fly toward the patrol path and the air defense system 1000 can be efficiently deployed. In addition, a flying object 100 can protect the protection target 10 in collaboration with other flying objects 100.

Second Embodiment

Figure 10:
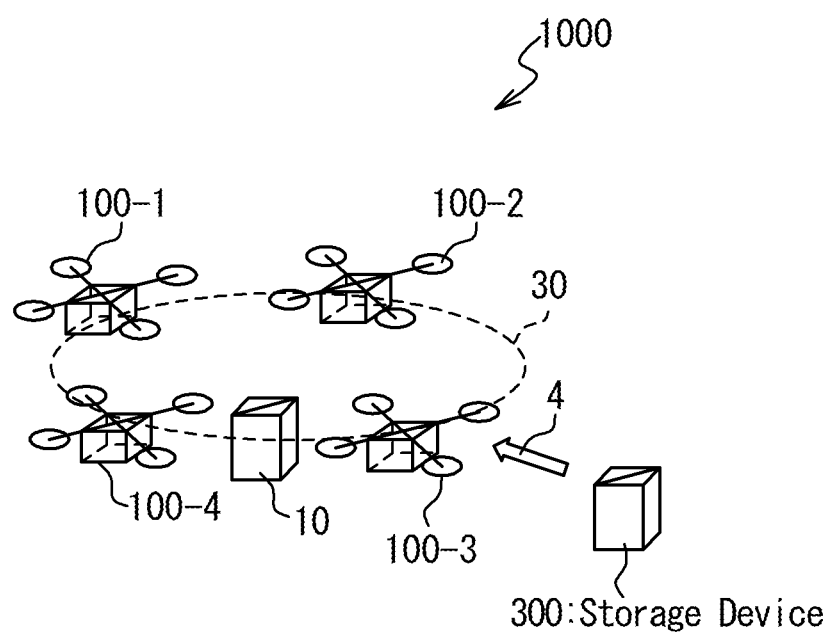
FIG. 10 It is a diagram to describe an outline of deploying flying objects on a defense line according to an embodiment.

As shown in FIG. 10, the flying object 100 may deploy on the defense line 30 automatically from a storage device 300. The storage device 300 stores a plurality of flying objects 100. When a user instructs a deployment of the flying objects 100 on the defense line 30, the flying objects 100 fly, as shown by the arrow 4, from the storage device 300 to the defense line 30. This configuration except the storage device 300 is similar to the first embodiment and therefore a detailed description thereof will be omitted.

Figure 11:
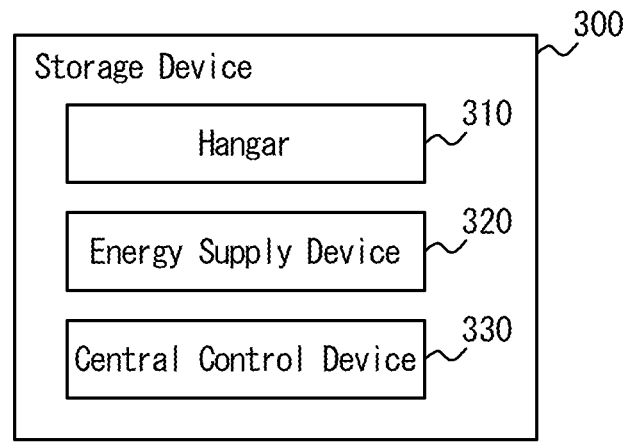
FIG. 11 It is a configuration diagram of a storage device according to an embodiment.

As shown in FIG. 11, the storage device 300 is provided with a hangar 310, an energy supply device 320 and a central control device 330. The hangar 310 stores a plurality of flying objects 100. The hangar 310 may have a plurality of hangar spaces each of that stores a flying object 100. The hangar spaces may be divided by a wall from each other.

The energy supply device 320 supplies, when a flying object 100 is stored in the hangar 310, energy to an energy container 150 of the flying object 100. For example, when a flying object 100 uses electric power, the energy supply device 320 may be provided with an electric power transmission device that transmits electric power to the flying object 100 by wire or wirelessly. When a flying object 100 uses fuel, the energy supply device 320 may be provided with a supply port that supplies fuel to a fuel tank of the flying object 100.

The central control device 330 assigns the patrol paths on the defense line 30 to the flying objects 100. The central control device 330 sets the defense line 30 based on an input from a user. The central control device 330 determines, based on the input from the user, the flying objects 100 that fly to the defense line 30 that is set. In addition, the central control device 330 controls the hangar 310 and the energy supply device 320.

Figure 12:
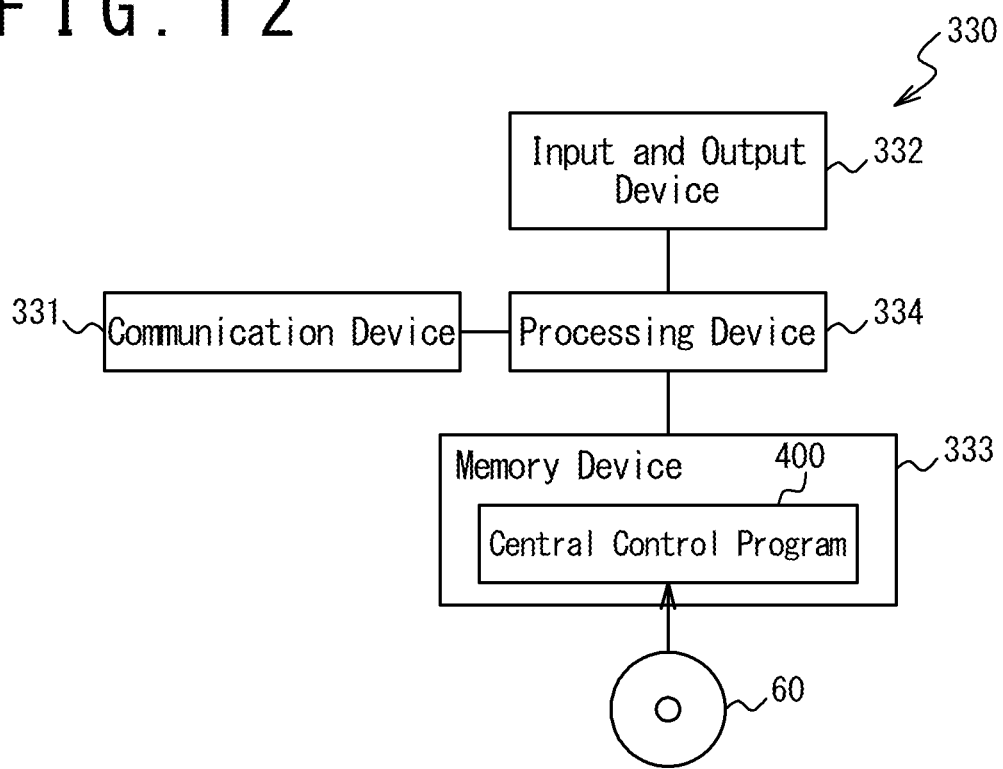
FIG. 12 It is a configuration diagram of a central control device according to an embodiment.

As shown in FIG. 12, the central control device 330 may be provided with a communication device 331, an input and output device 332, a memory device 333 and a processing device 334. The communication device 331 is electrically connected to the flying objects 100, the hangar 310 and the energy supply device 320, and performs communication with respective devices by wire or wirelessly. The communication device 331 transfers data received from respective devices to the processing device 334. In addition, the communication device 331 transfers signals generated by the processing device 334 to respective devices. The communication device 331 includes various interfaces such as NIC or USB.

The input and output device 332 receives information for the processing device 334 to execute processes. In addition, the input and output device 332 outputs a result of processes executed by the processing device 334. For example, information of the defense line 30 is inputted to the input and output device 332. In addition, information of the flying objects 100 such as positions, remaining energy quantity may be outputted to the input and output device 332. The input and output device 332 includes a variety of input devices and output devices, and includes for example a keyboard, a mouse, a microphone, a display, a speaker, a touch panel and the like. The input and output device 332 may be removed when no information is inputted.

The memory device 333 stores various data for assigning the control paths to the flying objects 100, such as a central control program 400. The memory device 333 is used as a non-transitory tangible storage medium that stores the central control program 400. The central control program 400 may be provided as a computer program product stored in a recording medium 60 readable by a computer or may be provided as a computer program product downloadable from a server. It should be noted that the recording medium 60 may be same as the recording medium 50.

The processing device 334 performs various data processes for assigning the patrol paths to the flying objects 100. The processing device 334 reads from the memory device 333 and executes the central control program 400 to assign the control paths to the flying objects 100. For example, the processing device 334 includes a CPU and the like.

Figure 13:
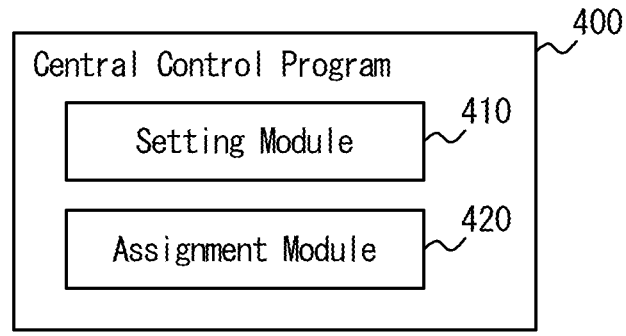
FIG. 13 It is a configuration diagram of a central control program according to an embodiment.

As shown in FIG. 13, the central control program 400 executed by the processing device 334 is provided with a setting module 410 and an assignment module 420. In accordance with the setting module 410, the processing device 334 stores information of the defense line 30 inputted from the input and output device 332 in the memory device 333. The assignment module 420 assigns, based on the information of the defense line 30 stored in the memory device 333, the patrol paths to the flying objects 100. A flying object 100 to that a patrol path is assigned executes the deployment module 230 and flies from the hangar 310 to the patrol path.

(Operations of the Storage Device)

The storage device 300 supplies, when a flying object 100 is stored in the hangar 310, energy to the flying object 100 by the energy supply device 320. For example, the hangar 310 is provided with a sensor that detects that a flying object 100 is stored. When the sensor detects that a flying object 100 is stored, the energy supply device 320 acquires a remaining energy quantity from the flying object 100 and supplies energy to the flying object 100 based on the remaining energy quantity.

The central control device 330 of the storage device 300 acquires information of the defense line 30 from an input by a user. The processing device 334 of the central control device 330 executes the setting module 410. The processing device 334 displays a screen for inputting information of the defense line 30 on the input and output device 332 for example. The user inputs the information of the defense line 30 by looking at the displayed screen. For example, the information of the defense line 30 includes a position of the protection target 10, a number of the flying objects 100 deployed on the defense line 30, patrol paths to be patrolled by respective flying objects 100, a path change table 231 used when changing the patrol paths, and the like. A patrol path may be set by a relative position with respect to the protection target 10.

Figure 14:
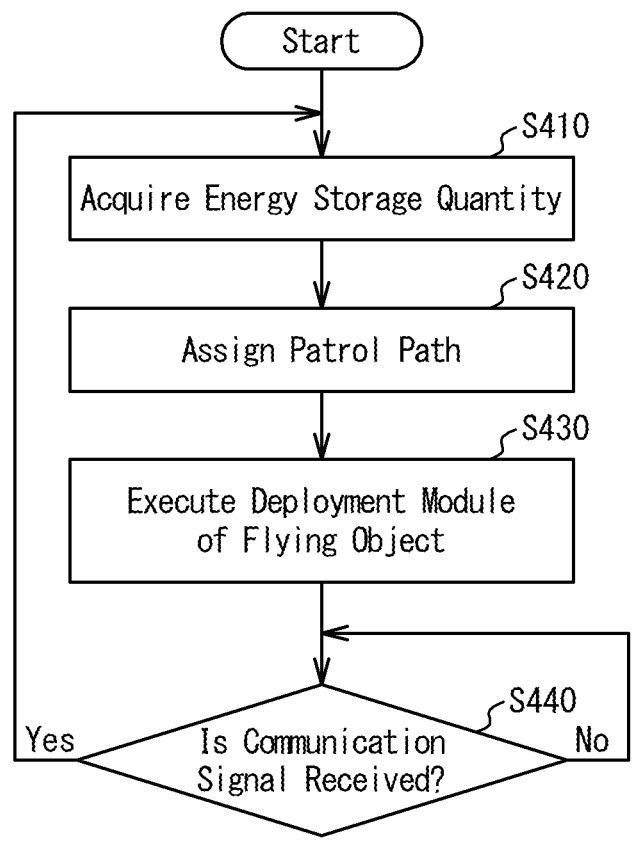
FIG. 14 It is a flowchart that shows processes of an assignment module according to an embodiment.

The central control device 330 assigns a patrol path to a flying object 100 in accordance with an input by a user. For example, the user inputs a defense instruction on the defense line to the input and output device 332. The processing device 334 executes the assignment module 420 based on the defense instruction inputted to the input and output device 332. The assignment module 420 makes the processing device 334 execute processes shown in FIG. 14.

In step S410, the processing device 334 acquires energy storage quantity of each flying object 100. Each flying object 100 measures energy storage quantity stored in the energy container 150. The processing device 334 acquires the measured energy storage quantity.

In step S420, the processing device 334 assigns a patrol path to a flying object 100. The processing device 334 acquires a number of flying objects 100 to be made to patrol (herein after referred to as patrol quantity) based on the information of the defense line 30 that is set. The processing device 334 selects a patrol quantity of flying objects 100 among the flying objects 100 that are stored based on the acquired energy storage quantities. For example, the processing device 334 extracts the patrol quantity of flying objects 100 among the stored flying objects 100 in a descending order of energy storage quantity. The processing device 334 assigns patrol paths included in the information of the defense line 30 to the extracted flying objects 100, respectively.

In step S430, the processing device 334 makes each of the extracted flying objects 100 execute the deployment module 230. The processing device 334 transmits an assignment signal including information indicating the patrol paths and information indicating the path change table 231 to the extracted flying objects 100. The information of the patrol paths to be transmitted to the flying objects 100 may include information indicating all patrol paths included in the information of the defense line 30 and not only the assigned patrol paths. The flying objects 100 receive the assignment signal and then execute the deployment module 230. By doing so, the flying objects 100 fly from the hangar 310 toward the patrol paths.

In step S440, the processing device 334 determines whether a notification signal from a flying object 100 is received. While no notification signal is received (step S440: No), the processing device 334 waits until a notification signal is received. When a notification signal is received (step S440: Yes), the processing device 334 returns to the process in step S410 and repeats the process. A flying object 100 transmits a notification signal when it leaves the patrol path and flies toward the target 20. When the processing device 334 receives a notification signal, a number of the flying objects 100 in patrol on the defense line is decreased. For this reason, when a notification signal is received, the processing device 334 returns to the process in step S410 and makes a flying object 100 fly from the hangar 310 in order to increase the flying objects 100 in patrol on the defense line 30.

As described above, the storage device 300 can make the flying objects 100 fly toward the defense line 30. In addition, the flying objects 100 can fly toward the defense line 30 based on a notification signal transmitted by another flying object 100. It should be noted that the central control device 330 may be provided separately from the storage device 300.

Third Embodiment

Figure 15:
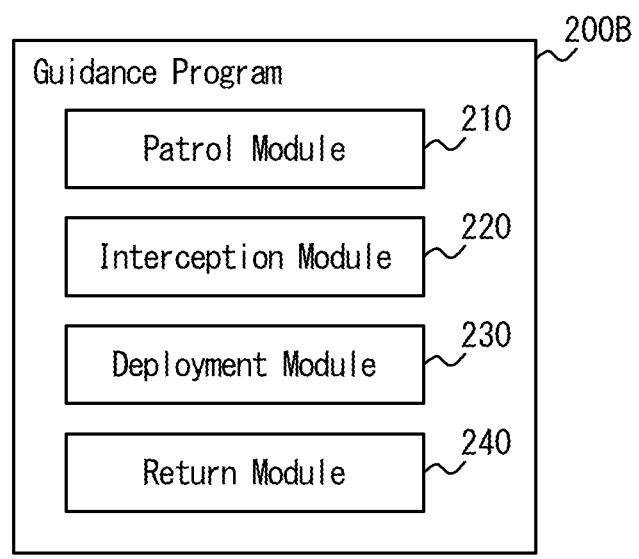
FIG. 15 It is a configuration diagram of a guidance program according to an embodiment.

A flying object 100 may automatically return to the storage device 300 when the energy storage quantity is less than a return limit quantity. In this case, as shown in FIG. 15, the guidance program 200B is provided with the patrol module 210, the interception module 220, the deployment module 230 and a return module 240. The configuration except the guidance program 200B is similar to the first and second embodiments and therefore detailed description will be omitted. The patrol module 210, the interception module 220 and the deployment module 230 are similar to the first and second embodiments and therefore detailed description will be omitted.

Figure 16:
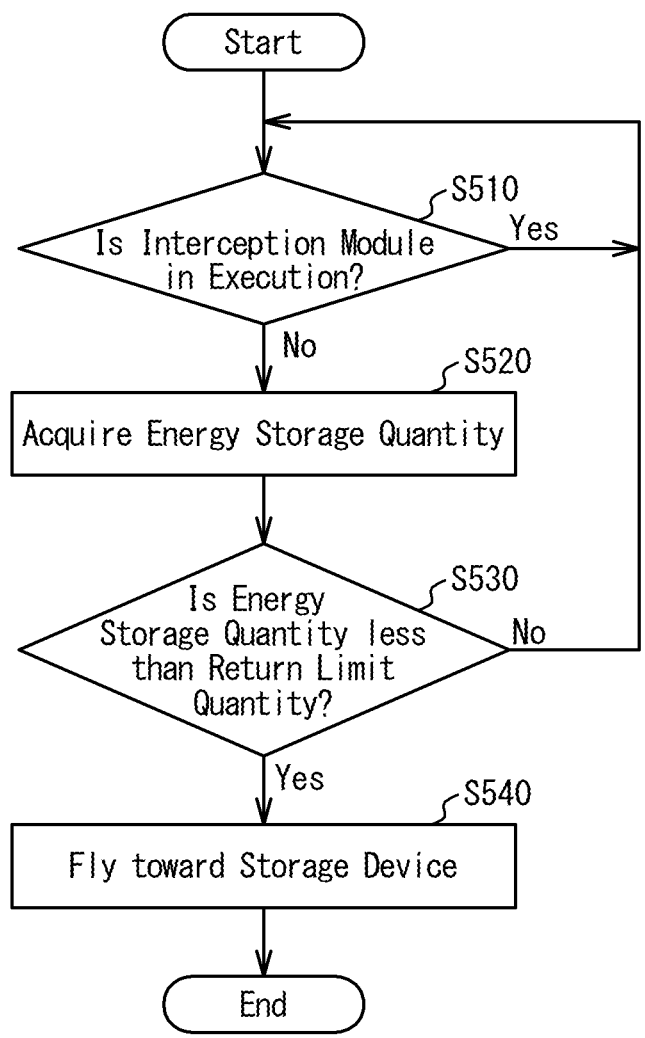
FIG. 16 It is a flowchart that shows processes of a return module according to an embodiment.

The processing device 124 controls the flying object 100 so as to return based on the energy storage quantity by executing the return module 240. The return module 240 makes the processing device 124 execute processes shown in FIG. 16.

In step S510, the processing device 124 determines whether the interception module 220 is in execution. When the interception module 220 is in execution (step S510: Yes), the processing device 124 waits for the processes of the interception module 220 to end. This is because when the processing device 124 is executing the interception modules 220, the flying object 100 is flying toward the target 20 in order to intercept the target 20. When the interception module 220 is not in execution (step S510: No), the processing device 124 executes a process in step S520.

In step S520, the processing device 124 acquires the energy storage quantity. The energy container 150 measures the energy storage quantity indicating the electric power and the fuel that are stored. The processing device 124 acquires the energy storage quantity from the energy container 150.

In step S530, the processing device 124 determines whether the acquired energy storage quantity is less than the return limit quantity. When the energy storage quantity is equal to or above the return limit quantity (step S530: No), the processing device 124 determines that the flying object 100 needs not to return, returns to the process in step S510 and repeats the process. When the energy storage quantity is less than the return limit quantity (step S530: Yes), the processing device 124 executes a process in step S540 to make the flying object 100 return.

The return limit quantity is a predetermined value. For example, the return limit value is set based on an energy quantity that enables a flight from the defense line 30 to the storage device 300. When a flying object 100 stores a plurality of types of energy such as electric power, fuel and the like, a return limit quantity may be set in each type of energy.

In step S540, the processing device 124 flies toward the storage device 300 to return. A position of the storage device 300 may be stored in the memory device 123 in advance. In addition, in step S540, the processing device 124 may acquire the position of the storage device 300 from the storage device 300. The processing device 124 generates, when the position of the storage device 300 is acquired, a return control signal for controlling the propulsion device 110 so that the flying object 100 returns to the storage device 300.

In addition, the processing device 124 may generate a notification signal indicating that the flying object 100 leaves the patrol path. By a transmission of a notification signal from the processing device 124 to other flying objects 100, the other flying objects 100 can be notified of an existence of a flying object 100 that leaves the patrol path. For this reason, the other flying objects 100 can change the patrol paths based on the notification signal.

As described above, the flying object 100 can automatically return to storage device 300 based on the energy storage quantity.

The path change table 231 may be different when another flying object 100 returns and when another flying object 100 intercepts. For example, when another flying object 100 intercepts, a patrol path may be changed so as to occupy a space where the intercepting flying object 100 was and when another flying object 100 returns the patrol path may not be changed.

A flying object 100 may return by an input by a user of a return instruction to the central control device 330 of the storage device 300. For example, the user inputs a return instruction to the input and output device 332 of the central control device 330. The processing device 334 generates, based on the inputted return instruction, a return signal for instructing the flying object 100 to return. The flying object 100 returns to the storage device 300 based on the return signal.

Fourth Embodiment

A flying object 100 may return when failing interception. In addition, a flying object 100 may fly toward a patrol path when failing interception. In this case, the configuration except the interception module 220 is similar to the first to third embodiments and therefore detailed description will be omitted.

Figure 17A:
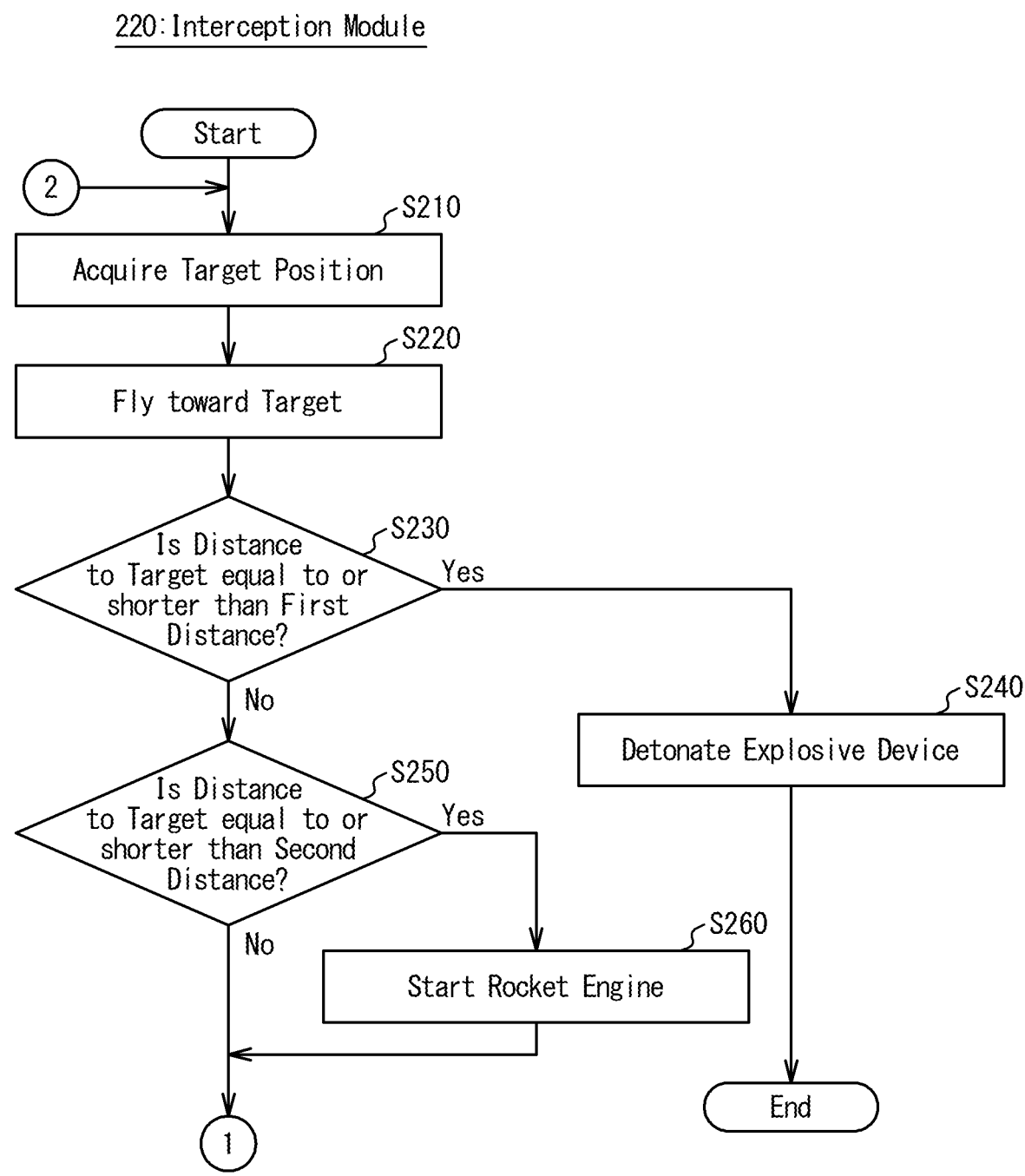
FIG. 17A It is a flowchart that shows processes of an interception module according to an embodiment.
Figure 17B:
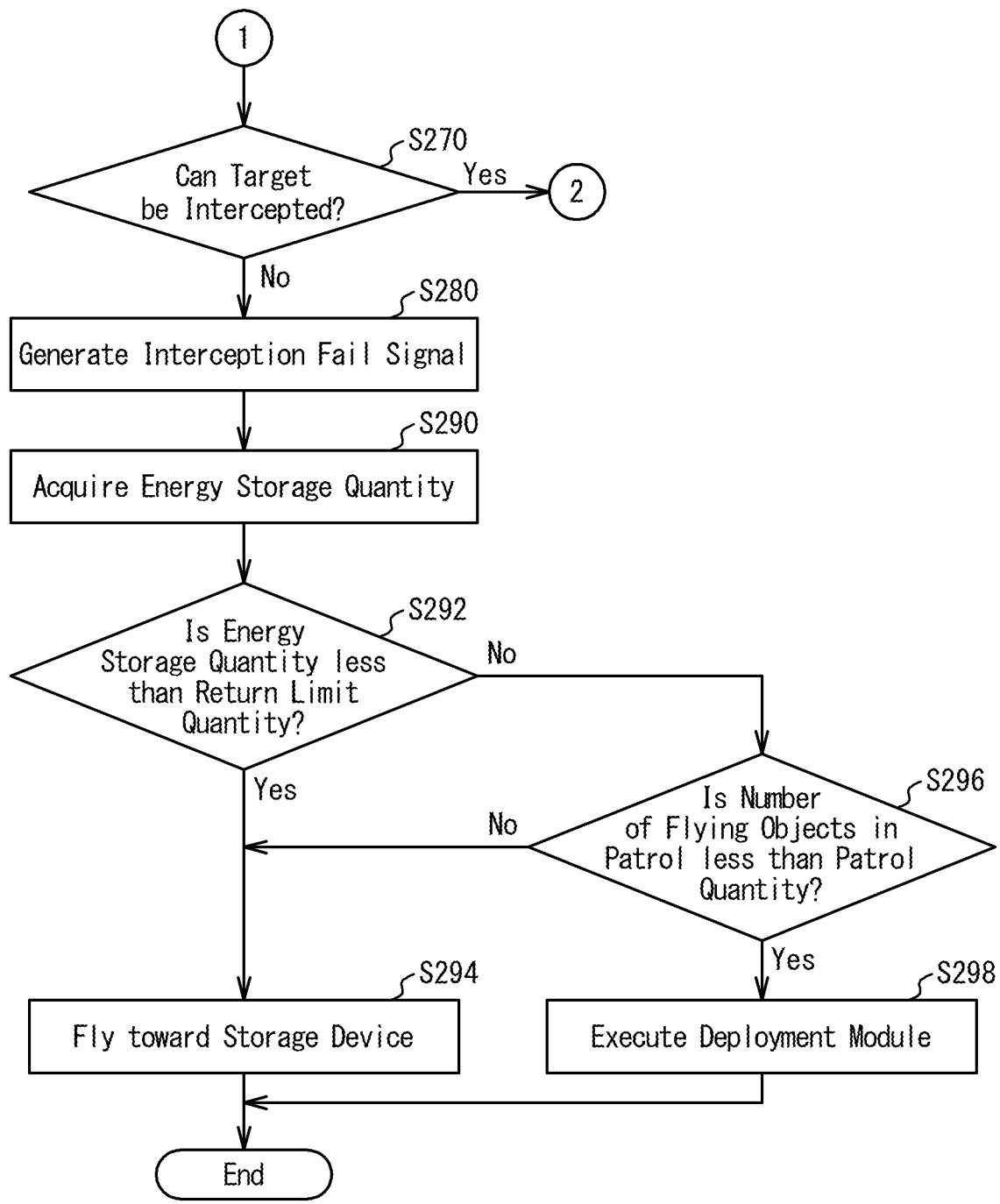
FIG. 17B It is a flowchart that shows processes of an interception module according to an embodiment.

The interception module 220 makes the processing device 124 execute processes shown in FIGS. 17A and 17B. Processes in steps S210 to S280 are similar to the first to third embodiments and therefore detailed description will be omitted.

In step S290, the processing device 124 acquires the energy storage quantity. The energy storage quantity is measured by the energy container 150.

In step S292, the processing device 124 determines whether the acquired energy storage quantity is less than the return limit quantity. When the energy storage quantity is equal to or above the return limit quantity (step S292: No), the processing device 124 determines that the energy storage quantity is enough and executes a process in step S296. When the energy storage quantity is less than the return limit quantity (step S292: Yes), the processing device 124 executes a process in step S294 to make the flying object 100 return.

In step S294, the processing device 124 flies toward the storage device 300 in order to return. The position of the storage device 300 may be stored in the memory device 123 in advance. The processing device 124 generates, when acquiring the position of the storage device 300, a return control signal for controlling the propulsion device 110 so that the flying object 100 returns to the storage device 300.

When the energy storage quantity is equal to or above the return limit quantity (step S292: No), the processing device 124 determines in step S296 whether a number of the flying objects 100 in patrol on the defense line 30 is less than the patrol quantity. When the number of the flying objects 100 in patrol is less than the patrol quantity (step S296: Yes), the processing device 124 moves to step S298, executes the deployment module 230 and flies to the patrol path on the defense line 30. When the number of flying objects 100 in patrol is equal to or above the patrol quantity (step S296: No), the processing device 124 executes step S294 and makes the flying object 100 return to the storage device 300.

In step S298, the processing device 124 executes the deployment module 230 and makes the flying object 100 fly toward the patrol path. The patrol path is acquired from the storage device 300. The central control device 330 of the storage device 300 makes a flying object 100 fly toward the patrol path when receiving a notification signal. When no flying object 100 to make fly is stored in the hangar 310, the central control device 330 stores the patrol path where a flying object 100 is to go toward.

As described above, a flying object 100 can fly toward the storage device 300 or the patrol path when failing interception.

(Variation Examples)

Figure 18:
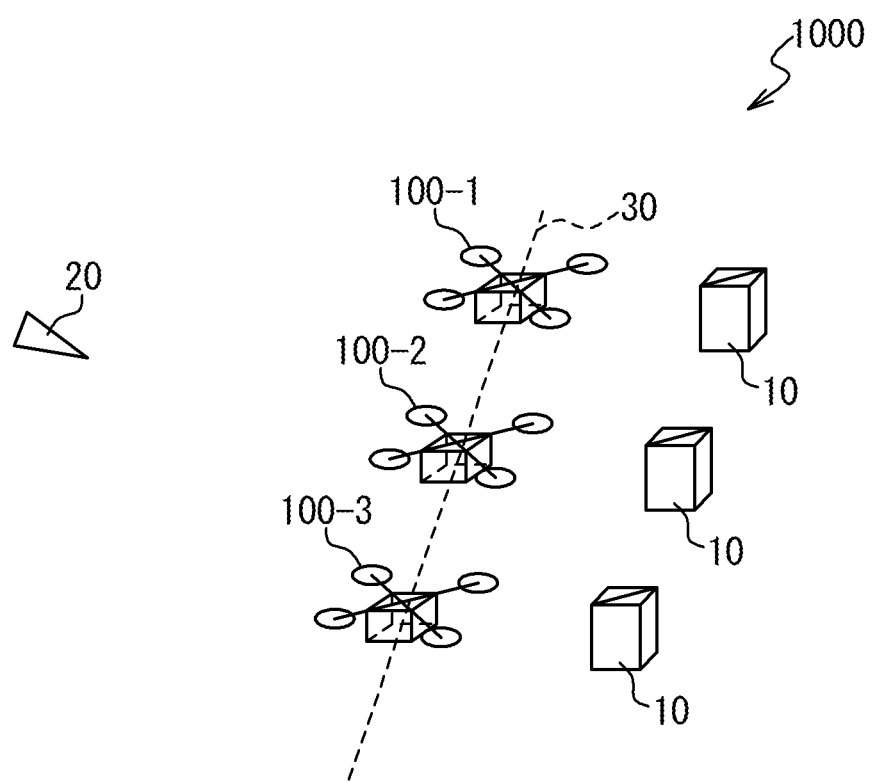
FIG. 18 It is a diagram to describe a defense line according to an embodiment.

The defense line 30 is arranged so as to protect the protection target 10 from the target and may be arranged as shown in FIG. 18 in a shape of a line between a desired pair of points. A patrol path for the flying objects 100 to patrol is arranged on the line between the desired pair of points.

A position and a time to pass this position may be set to the patrol path. In this case, the guidance device 120 controls the propulsion device 110 so that the flying object 100 passes the position set to the patrol path at the time set to the patrol path.

The patrol path may be determined in accordance with a number of the flying objects 100 in patrol on the defense line 30. For example, the patrol path may be set so that the flying objects 100 fly equidistantly on the defense line 30. In this case, the guidance device 120 determines the patrol path in accordance with the number of the flying objects 100 on the defense line 30. For this reason, the guidance device 120 updates the number of the flying objects 100 in patrol by storing a number of flying objects 100 that have flown from the storage device 300 toward the defense line 30 and receiving notification signals. In addition, in step S370 shown in FIG. 7, the processing device 124 of the guidance device 120 generates a patrol start signal indicating that the patrol path is reached and transmits it to other flying objects 100. When receiving a patrol start signal, the other flying objects 100 updates the number of the flying objects 100 in patrol and change the patrol paths.

In step S110 shown in FIG. 5A, the processing device 124 of the guidance device 120 may determine whether to intercept based on information of the target 20 detected by another flying object 100. For example, the processing device 124 executes the process in step S120 when information of the target 20 is received from another flying object 100 (step S110: Yes). When no information of the target 20 is received from another flying object 100 (step S110: No), the processing device 124 executes the process in step S150. The information of the target 20 may be received from an external device such as the storage device 300.

In step S120 shown in FIG. 5A, the processing device 124 of the guidance device 120 may acquire a threat level from the storage device 300. In this case, information of the target 20 detected by a detection device 130 of a flying object 100 is transmitted to the central control device 330 of the storage device 300. The central control device 330 calculates the threat level based on the information of the target 20. The calculated threat level is transmitted from the central control device 330 to the guidance device 120 of the flying object 100.

The protection target 10 may be a moving object. When the protection target 10 is a moving object, the patrol path is defined by a relative position with respect to the protection target 10. For example, the protection target 10 is provided with inertial device such as a Global Positioning System (GPS) receiver and measures a position of itself. The flying objects 100 update the patrol paths by acquiring the measured position of the protection target 10 from the protection target 10.

The embodiments and variation examples described above are examples and may be modified within a range of not inhibiting functions. In addition, the configurations described in each of the embodiments and the variation examples may be arbitrarily modified and/or arbitrarily combined within a range of not inhibiting functions. For example, the explosive device 140 may be omitted from the flying objects 100. In this case, steps S230 and S240 may be omitted from the interception module 220. In addition, the rocket engine 113 may be omitted from the flying objects 100. In this case, steps S250 and S260 may be omitted from the interception module 220.

The guidance device described in each embodiment is understood for example as below.

A guidance device according to a first aspect is provided with a processing device (124) that generates a control signal to control a propulsion device (110) of a flying object (100) and a communication device (121) that transmits the control signal to the propulsion device (110). The processing device (124) generates a patrol control signal to control the propulsion device (110) so that the flying object (100) flies along a first patrol path. The processing device (124) generates, based on information of a moving object (20) that the flying object (100) is to intercept, an interception control signal to control the propulsion device (110) so that the flying object (100) flies toward the moving object (20). The processing device (124) generates, when generating the interception control signal, a notification signal to notify that the flying object (100) flies toward the moving object.

The guidance device can efficiently deploy an air defense system. The guidance device controls so that the flying object flies along the first patrol path and controls so that the flying object flies toward the moving object. For this reason, the air defense system can be deployed by making the flying object fly to the first patrol path. In addition, a protection target can be protected in collaboration with other flying objects by generation of a notification signal by the guidance device.

The guidance device related to a second aspect is the guidance device related to the first aspect and is characterized in that the processing device (124) generates, based on a notification signal, a deployment control signal to control the propulsion device (110) so that the flying object (100) flies from the first patrol path to a second patrol path.

A flying object in patrol can occupy a gap occurred in the defense line due to a departure of a flying object from the patrol path by a change of patrol path by the processing device based on the notification signal.

A guidance device related to a third aspect is the guidance device related to the first aspect and is characterized in that the processing device (124) generates, based on the notification signal, a deployment control signal to control the propulsion device (110) so that the flying object (100) flies toward the first patrol path.

A flying object that is not in patrol can occupy a gap occurred in the defense line due to a departure of a flying object from the patrol path by a flight of a flying object toward the first patrol path based on the notification signal.

A guidance device related to a fourth aspect is the guidance device related to the first aspect and is characterized in that the processing device (124) generates, when an energy storage quantity of the flying object (100) is less than a return limit quantity, a return control signal to control the propulsion device (110) so that the flying object (100) returns.

As a result, the flying object can automatically return.

A flying object related to a fifth aspect is provided with the guidance device related to the first aspect, the propulsion device (110) and a detection device (130) that detects a moving object (20) to intercept.

The flying object can intercept the moving object based on a detection by the detection device.

A flying object related to a sixth aspect is the flying object related to the fifth aspect and is configured so that the propulsion device (110) is provided with a rotary wing (111).

A flying body related to a seventh aspect is the flying body related to the fifth aspect and is configured so that the propulsion device (110) is provided with a rocket engine (113).

As a result, the flying object can fly at high speed toward the moving object and rapidly change a direction of travel.

An air defense system related to an eighth aspect is provided with the flying object related to the fifth aspect, a hangar (310) and a central control device (330). The central control device (330) assigns a first patrol path to the flying object (100).

As a result, the flying object can fly from the storage device to the defense line, patrol on the defense line and intercept the moving object.

A guidance program related to a ninth aspect makes the processing device (124) execute a patrol module (210) and an interception module (220).

An air defense system can be efficiently deployed by the guidance program. In addition, a flying object can protect a protection target in collaboration with other flying objects.

The present application claims priority based on Japanese Patent Application No. 2019-230926 filed on Dec. 20, 2019 and herein incorporates all disclosures thereof by reference.

DESCRIPTION OF SYMBOLS

1 Arrow
2 Arrow
3 Arrow
4 Arrow
10 Protection target
20 Target
30 Defense line
50 Recording medium
60 Recording medium
100 Flying object 110 Propulsion device
111 Rotary wing
112 Motor
113 Rocket engine
120 Guidance device
121 Communication device
122 Input and output device
123 Memory device
124 Processing device
130 Detection device
140 Explosive device
150 Energy container
200 Guidance program
210 Patrol module
220 Interception module
230 Deployment module
231 Path change table
240 Return module
300 Storage device
310 Hangar
320 Energy supply device
330 Central control device
331 Communication device
332 Input and output device
333 Memory device
334 Processing device
400 Central control program
410 Setting module
420 Assignment module
1000 Air defense system

The invention claimed is:

1. A guidance device comprising:
a processing device configured to generate a control signal to control a propulsion device of a flying object; and
a communication device configured to transmit the control signal to the propulsion device,
wherein the processing device is further configured to:
generate a patrol control signal to control the propulsion device so that the flying object including the processing device flies along a first patrol path;
generate, based on information of a moving object that the flying object including the processing device is to intercept, an interception control signal to control the propulsion device so that the flying object including the processing device flies toward the moving object; and
generate, when generating the interception control signal, a notification signal to notify other flying objects that the flying object including the processing device flies toward the moving object, and
wherein a processing device of one of other flying objects is configured to generate, based on the notification signal, a deployment control signal to control a propulsion device of the one of other flying objects so that the one of other flying objects flies toward the first patrol path from a second patrol path.

2. The guidance device according to claim 1, wherein the processing device is further configured to:
generate, based on the notification signal, the deployment control signal to control the propulsion device of the one of other flying objects so that the one of other flying objects flies toward the first patrol path; and
generate the patrol control signal when the one of other flying objects arrives to the first patrol path.

3. The guidance device according to claim 1, wherein the processing device is further configured to generate, when an energy storage quantity of the flying object is less than a return limit quantity, a return control signal to control the propulsion device so that the flying object returns.

4. The flying object comprising:
the guidance device according to claim 1;
the propulsion device; and
a detection device configured to detect the moving object to intercept,
wherein the processing device is further configured to determine, based on information of the moving object detected by the detection device, whether to intercept the moving object.

5. The flying object according to claim 4, wherein the propulsion device comprises a rotary wing.

6. The flying object according to claim 4, wherein the propulsion device comprises a rocket engine.

7. An air defense system comprising:
the flying object according to claim 4;
a hangar configured to store a plurality of the flying objects; and
a central control device,
wherein the central control device is configured to:
assign the first patrol path to the flying object; and
transmit an assignment signal including information indicating the first patrol path to the flying object, and
wherein the processing device of the flying object is configured to generate, based on the assignment signal, a second deployment control signal to control the propulsion device so that the flying object flies toward the first patrol path.

8. A non-transitory computer readable recording medium storing a guidance program configured to make a processing unit execute:
a patrol module configured to generate a patrol control signal to control a propulsion device of a flying object so that the flying object flies along a first patrol path; and
an interception module configured to generate, based on information of a moving object that the flying object is to intercept, an interception signal to control the propulsion device so that the flying object flies toward the moving object,
wherein the patrol module includes generating, when generating the interception control signal, a notification signal to notify other flying objects that the flying object including the processing unit flies toward the moving object, and
wherein a processing device of one of other flying objects is configured to generate, based on the notification signal, a deployment control signal to control a propulsion device of the one of other flying objects so that one of other flying objects flies toward the first patrol path from a second patrol path.

* * * * *